Jan. 30, 1945. R. W. LE BRUN 2,368,479
DIAL INDICATOR
Filed Aug. 9, 1943

Inventor
Rosario W. LeBrun
By Alexander Dowell
Attorneys

Patented Jan. 30, 1945

2,368,479

UNITED STATES PATENT OFFICE 2,368,479

DIAL INDICATOR

Rosario W. Le Brun, Waterloo, N. Y.

Application August 9, 1943, Serial No. 497,992

2 Claims. (Cl. 33—172)

This invention is a novel dial indicator particularly adapted for use in connection with milling, grinding, or other machines, the indicator being ordinarily mounted upon a supporting attachment consisting of a case having an arm adjustably swingably mounted thereon in the manner shown in my U. S. Letters Patent No. 2,322,033, dated June 15, 1943, although the dial indicator may be mounted on any other desired support whereby same may be positioned to engage the work being operated upon by the machine, thereby dispensing with the necessity of having to remove the work from the machine or to use extraneous instruments in checking the dimensions of the work.

The principal object of the present invention is to provide a dial indicator of the above type having certain novel features of construction, imparting thereto simplicity and accuracy.

I will explain the invention with reference to the accompany drawing, which illustrates one practical embodiment thereof to enable others familiar with the art to adopt and use the same; and will summarize in the claims, the novel features of construction, and novel combinations of parts, for which protection is desired.

Figure 1:
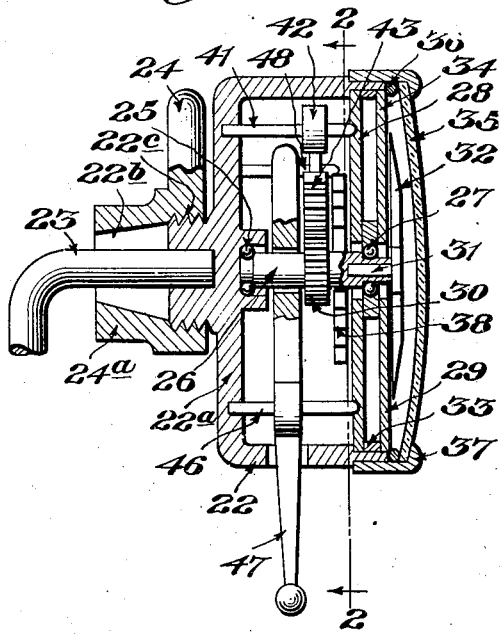
Fig. 1 is a vertical section through the dial indicator.

As shown, my novel dial indicator comprises a cup-shaped casing 22 having a closed base 22a and an open front, said casing having a split chuck 22b extending rearwardly of the base, the chuck having a conical outer wall and being adapted to receive the end of a rod support 23 (Fig. 1) which has one end engaged in the split chuck 22b. The base of the split chuck adjacent the base 22a of casing 22 is threaded exteriorly as at 22c and a nut 24 is mounted upon the threaded portion of the split chuck, the same having a conical extension 24a engaging the split chuck 22b whereby as the nut is tightened the split chuck 22b will be contracted around the supporting rod 23 and hold the same in adjusted position.

Figure 3:
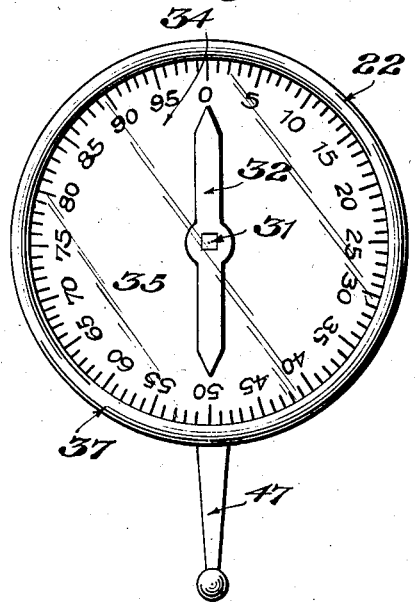
Fig. 3 is a front elevation of the dial indicator showing the face of the dial and the pointer, shown in Fig. 1.

Within the casing 22 at the base thereof is a recess receiving a ball bearing 25 in which one end of a shaft 26 is journaled, the opposite end of the shaft being journaled in ball bearing 27 mounted in a housing 28 carried by a plate 29 seated in a shoulder formed by an internal annular recess in the outer end of the casing 22, said housing 28 having an opening disposed coaxially of shaft 26, which shaft carries a gear 30. The outer end of the shaft 26 opposite the opening in the housing 28 has a non-circular bore adapted to receive the shank 31 of a pointer 32 whereby as the shaft 26 is rotated the pointer 32 will be correspondingly rotated. Within the outer end of casing 22 spaced from the plate 29 by a ring 33 is a graduated dial plate, as indicated in Fig. 3, and in the outer end of the casing 22 is a transparent cover 35 spaced from the dial plate 34 by a ring 36. A ferrule 37 having an internal annular flange at its outer end is secured exteriorly of casing 22 by threads or the like, said ferrule holding the members 29, 34 and 35 in place by means of the spacing collars 33 and 36, the pointer 32 moving in the space between the dial plate 34 and the transparent closure 35.

The shaft 26 is normally urged to rotate in one direction by means of a coiled spring 38 (Fig. 2) having one end fixed to the shaft 26 and its opposite end secured in a post 39 which is mounted on the wall of casing 22 by means of screws 40.

Figure 2:
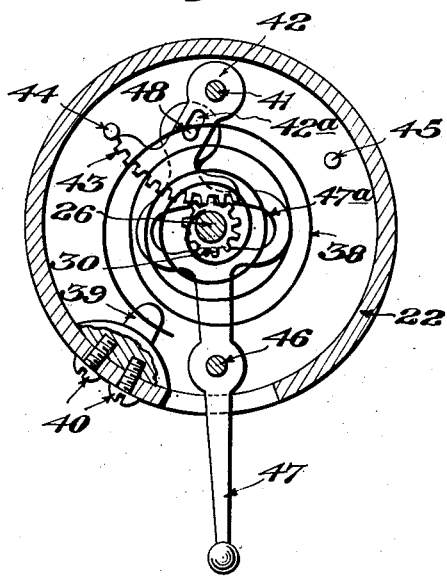
Fig. 2 is a transverse section on the line 2—2, Fig. 1.
Figure 4:
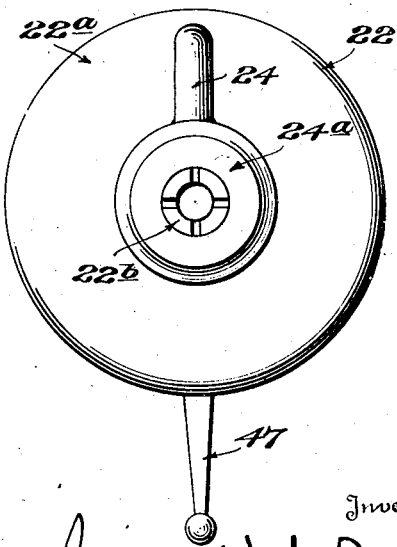
Fig. 4 is a rear elevation of the dial indicator shown in Fig. 1.

Within casing 22 parallel with but offset from the shaft 26 is a rock shaft 41 having its ends journaled in the base 22a of the casing and in the plate 29, said shaft having an arm 42 thereon carrying a gear segment 43 in constant mesh with gear 30 on shaft 26. Stop pins 44 and 45 engage the ends of segment 43 to control the swinging movement of the arm 42, and when the segment engages stop 44 as shown in Fig. 2 the pointer 32 will lie opposite the zero graduation of the dial 34 owing to the action of the spring 38, the other stop 45 (Fig. 2) limiting the movement of the pointer in a clockwise direction, but permitting the pointer 32 to make one complete revolution.

Within casing 22 at the side opposite from rock shaft 41 is a shaft 46 upon which is mounted a ball lever 47 having a slot 47a receiving the pointer shaft 26, the inner end of lever 47 extending beside the arm 42 of the segmental gear 43 and carrying on its inner end a laterally projecting pin 48 engaging an elongated slot 42a in the arm 42 whereby as the lever 47 is pivoted the arm 42 will be correspondingly rocked and the pointer 32 correspondingly rotated. When however the pressure on the lever 47 is removed the spring 38 will restore the pointer 32 to position overlying the zero mark of the dial 34, which dial may be graduated in any desired manner, for any desired purpose.

I do not limit my invention to the exact forms shown in the drawing, for obviously changes may be made therein within the scope of the claims.

I claim:

1. A dial indicator, comprising a casing; a pointer shaft journaled therein carrying a gear; a rock shaft journaled therein beside the pointer shaft; an arm on said rock shaft having an axial slot and carrying a gear segment meshing with said gear; means urging the pointer shaft to rotate in one direction; and a ball lever extending into and pivoted within said casing and having a member slidably engaging the slot in the arm of the rock shaft, whereby when the ball lever is swung the pointer shaft will be rotated in the opposite direction, said ball lever having an arcuate slot therein receiving the pointer shaft in any position of the lever to permit swinging of the lever; the inner end of the lever extending beside the arm on the rock shaft; and said member comprising a lateral projection on the inner end of the lever engaging said slot in said arm.

2. In an indicator attachment, an indicator comprising a casing, a pointer shaft journaled therein carrying a gear, a rock shaft journaled therein beside the pointer shaft; an arm on said rock shaft carrying a gear segment meshing with the gear; means for limiting the stroke of the gear segment whereby the gear may make one complete revolution; means urging the pointer shaft to rotate in one direction; and a ball lever extending into and pivoted within said casing and engaging the arm of the rock shaft, whereby when the ball lever is swung the pointer shaft will be rotated in the opposite direction within the limits of one complete revolution; said ball lever having an arcuate slot therein receiving the pointer shaft in any position of the lever to permit swinging of the lever; the inner end of the lever extending beside the arm on the rock shaft; and a lateral projection on the inner end of the lever engaging an elongated slot in said arm, whereby as the lever is pivoted the arm will be correspondingly rocked and the pointer shaft correspondingly rotated.

ROSARIO W. LE BRUN.